United States Patent
Kuroda et al.

(10) Patent No.: US 12,351,010 B2
(45) Date of Patent: Jul. 8, 2025

(54) HIGH VOLTAGE DEVICE MOUNTING STRUCTURE OF VEHICLE

(71) Applicant: Honda Motor Co., Ltd., Tokyo (JP)

(72) Inventors: Shuji Kuroda, Tokyo (JP); Nobutaka Fukamizu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 18/310,542

(22) Filed: May 2, 2023

(65) Prior Publication Data

US 2023/0406083 A1 Dec. 21, 2023

(30) Foreign Application Priority Data

Jun. 17, 2022 (JP) .................................. 2022-098480

(51) Int. Cl.
  *B60K 1/00* (2006.01)
  *B62D 25/08* (2006.01)
  *H02K 5/04* (2006.01)
(52) U.S. Cl.
  CPC .............. *B60K 1/00* (2013.01); *B62D 25/082* (2013.01); *H02K 5/04* (2013.01)
(58) Field of Classification Search
  CPC ........... B60K 1/00; B62D 25/082; H02K 5/04
  See application file for complete search history.

(56) References Cited

U.S. PATENT DOCUMENTS

| 11,305,628 | B2 * | 4/2022 | Tanaka | B60K 1/04 |
| 12,172,524 | B1 * | 12/2024 | Tanimura | B60K 5/1216 |
| 2016/0207386 | A1 * | 7/2016 | Nagaosa | B60K 1/04 |
| 2020/0262481 | A1 * | 8/2020 | Yamada | B62D 21/11 |

FOREIGN PATENT DOCUMENTS

JP 2021160523 10/2021

* cited by examiner

*Primary Examiner* — Erez Gurari
(74) *Attorney, Agent, or Firm* — JCIPRNET (57) ABSTRACT

A first inclined part (41) and a second inclined part (11) inclined inward in a vehicle width direction toward a rear of the vehicle are respectively provided on a surface (40c) facing an outer side in the vehicle width direction in a cover member (40) covering an opening (34) of a casing (30) and a surface (10d) facing an inner side in the vehicle width direction in a side frame (10). The first inclined part (41) and the second inclined part (11) are at positions at least partially facing each other. The first inclined part (41) is inclined more than the second inclined part (11). A rear end (40b) of the first inclined part (41) in the cover member (40) extends to a position behind a mating surface (35) with the cover member (40) in the casing (30).

18 Claims, 6 Drawing Sheets

HIGH VOLTAGE DEVICE MOUNTING STRUCTURE OF VEHICLE

CROSS-REFERENCE TO RELATED APPLICATION

This application claims the priority benefit of Japanese Application Serial No. 2022-098480, filed on Jun. 17, 2022. The entirety of the above-mentioned patent application is hereby incorporated by reference herein and made a part of this specification.

BACKGROUND

Technical Field

The invention relates to a high voltage device mounting structure of a vehicle including a high voltage device, such as an electric motor mounted in a vehicle or a control device thereof.

Description of Related Art

For example, as disclosed in Patent Document 1, in an engine room of a hybrid vehicle or an electric vehicle, an electric motor that is a driving device of the vehicle and a casing accommodating the electric motor are disposed. Such electric motor is a high voltage device driven at a high voltage. Therefore, at the time of a vehicle collision, etc., if the casing is severely damaged, a high voltage current may flow from the electric motor to a frame, etc., of the vehicle body. Therefore, a structure capable of suppressing a damage to the casing to the minimum even when an impact, such as a collision, is applied is required.

PRIOR ART DOCUMENTS

Patent Documents

[Patent Document 1] Japanese Laid-open No. 2021-160523

In particular, at the time of a collision at the front of the vehicle, since a load in a direction that causes a displacement toward the rear of the vehicle is applied to the casing of the electric motor, a structure capable of suppressing an excessive displacement of the casing with respect to the load, a structure capable of appropriately releasing the load by intentionally displacing the casing to a certain extent, or a structure that avoids a collision between the casing and another portion with a high rigidity, such as the frame of the vehicle body, is required.

SUMMARY

According to an aspect of the invention, a high voltage device mounting structure of a vehicle is provided. The high voltage device mounting structure includes: a casing, accommodating a high voltage device driven at a high voltage and disposed in an engine room of the vehicle; a cover member, covering an opening of the casing; and a side frame, extending in a front-rear direction of the vehicle at a side part of the engine room. A first inclined part inclined inward in a vehicle width direction toward a rear of the vehicle is provided on a surface facing an outer side in the vehicle width direction in the cover member. A second inclined part inclined inward in the vehicle width direction toward the rear of the vehicle is provided on a surface facing an inner side in the vehicle width direction in the side frame. The first inclined part and the second inclined part at least partially face each other, and the first inclined part is inclined more than the second inclined part, and a rear end of the first inclined part in the cover member extends to a position behind a mating surface with the cover member in the casing.

According to another aspect of the invention, a high voltage device mounting structure of a vehicle is provided. The high voltage device mounting structure includes: a casing, accommodating a high voltage device driven at a high voltage and disposed in the vehicle: a cover member, covering an opening of the casing; and a side frame, extending in a front-rear direction of the vehicle at a side part of the cover member. A first inclined part inclined inward in a vehicle width direction toward a front of the vehicle is provided on a surface facing an outer side in the vehicle width direction in the cover member. A second inclined part inclined inward in the vehicle width direction toward the front of the vehicle is provided on a surface facing an inner side in the vehicle width direction in the side frame. The first inclined part and the second inclined part at least partially face each other, and the first inclined part is inclined more than the second inclined part, and a front end of the first inclined part in the cover member extends to a position ahead of a mating surface with the cover member in the casing.

DESCRIPTION OF THE EMBODIMENTS

The invention provides a high voltage device mounting structure of a vehicle capable of appropriately protecting a high voltage device or a casing thereof at the time of a collision of the vehicle by using a simpler structure. In addition, an objective of the invention is to improve the safety of the vehicle. In addition, it further improves traffic safety and contributes to the development of a sustainable transportation system.

In order to solve the issue of the invention, an aspect of the invention provides a high voltage device mounting structure of a vehicle. The high voltage device mounting structure includes: a casing (30), accommodating a high voltage device (G, M) driven at a high voltage and disposed in an engine room (3) of the vehicle; a cover member (40), covering an opening (34) of the casing (30); and a side frame (10), extending in a front-rear direction of the vehicle at a side part of the engine room (3). A first inclined part (41) inclined inward in a vehicle width direction toward a rear of the vehicle is provided on a surface (40c) facing an outer side in the vehicle width direction in the cover member (40). A second inclined part (11) inclined inward in the vehicle width direction toward the rear of the vehicle is provided on a surface (10d) facing an inner side in the vehicle width direction in the side frame (10). The first inclined part (41) and the second inclined part (11) at least partially face each other, and the first inclined part (41) is inclined more than the second inclined part (11). a rear end (40b) of the first inclined part (41) in the cover member (40) extends to a position behind a mating surface (35) with the cover member (40) in the casing (30). Here, an example of the high voltage device accommodated in the casing is an electric motor (G, M).

According to the high voltage device mounting structure of the vehicle according to the invention, since the first inclined part of the cover member and the second inclined part of the side frame at least partially face each other, at the time of a collision of the vehicle, in the case where the high voltage device (the casing and the cover member) in the engine room is displaced rearward by inputting a load of the collision from the front part of the vehicle, the first inclined part of the cover member displaced rearward comes into contact (collides) with the second inclined part of the side frame. At this time, by arranging both of the first inclined part and the second inclined part as inclined surfaces inclined inward in the vehicle width direction toward the rear of the vehicle, it is possible for the first inclined part and the second inclined part to slide and move relatively in an oblique direction through contact of the inclined surfaces. Therefore, it is possible to effectively alleviate the impact or the load of such contact (collision). In particular, by making the first inclined part more inclined than the second inclined part, it is possible to more effectively alleviate the impact or the load of the contact (collision).

In the invention, furthermore, with the rear end of the first inclined part in the cover member extending to a position behind the mating surface with the cover member in the casing, it is possible to increase the length of the first inclined part of the cover member, so the impact or the load of the contact (collision) between the first inclined part and the second inclined part can be effectively reduced. In addition, even in the case where the cover member and the casing come into contact with other components located behind the engine room after the first inclined part of the cover member comes into contact (collides) with the second inclined part of the side frame, the impact of the collision to the casing can be reduced, as the rear end of the cover member contacts such other components prior to the casing. Therefore, it is possible to effectively protect the high voltage device by preventing the damage of the casing in advance.

In addition, in the high voltage device mounting structure of the vehicle, it may also be that at least a portion of the first inclined part (41) of the cover member (40) extends to a position on an inner side with respect to an innermost position in the vehicle width direction in the side frame (10).

According to the configuration, with at least a portion of the first inclined part of the cover member extending to the position on the inner side with respect to the innermost position in the vehicle width direction in the side frame, the contact of the inclined parts between the first inclined part and the second inclined part can be reliably carried out, and the first and second inclined parts can slide and move relatively in an oblique direction.

In addition, in the high voltage device mounting structure of the vehicle, it may also be that a position limiting member (50) for the cover member (40) is interposed on a mating surface (35, 45) between the casing (30) and the cover member (40), and multiple position limiting members (50) are provided on the mating surface (35, 45).

According to the configuration, with the position limiting members interposed on the mating surface with the cover member in the casing, it is possible to easily and reliably position the cover member with respect to the casing.

In addition, in the high voltage device mounting structure of the vehicle, it may also be that the position limiting members (50) are disposed at positions overlapped with the second inclined part (11) of the side frame (10) when viewed from the vehicle width direction.

According to the configuration, by disposing the positioning members at the positions overlapped with the second inclined part of the side frame when viewed from the vehicle width direction, in the case where the first inclined part of the cover member comes into contact (collides) with the second inclined part of the side frame, the concern that the position of the cover member is deviated or the cover member is damaged can be reduced. Therefore, it is possible to effectively protect the casing as well as the high voltage device in the casing.

In addition, in the high voltage device mounting structure of the vehicle, the structure may include a partition member (5a) disposed at a rear part of the engine room (3) to partition the engine room (3) and a vehicle compartment (6), a rear end (10b) of the side frame (10) may be connected with the partition member (5a), and a reinforcement member (15) reinforcing a connection part (13) connected with the side frame (10) and the partition member (5a) may be installed to the connection part (13).

In addition, in such case, it may also be that the second inclined part (11) of the side frame (10) and the reinforcement part (15) are disposed side-by-side in the front-rear direction of the vehicle and at a same position in the vehicle width direction.

According to the configuration, with the reinforcement member that reinforces the connection part being installed to the connection part connected with the side frame and the dashboard lower, at the time of a vehicle collision, in the case of a further rearward displacement after the first inclined part of the cover member displaced rearward comes into contact (collides) with the second inclined surface of the side frame, the cover member is stopped by the reinforcement member. Therefore, the displacement amount of the cover member can at least be suppressed. Therefore, by reducing the displacement amount of the casing and the high voltage device, it is possible to effectively protect the high voltage device or cables, etc., connected with the high voltage device.

As another aspect, the invention provides a high voltage device mounting structure of a vehicle. The high voltage device mounting structure includes: a casing (130), accommodating a high voltage device driven at a high voltage and disposed in the vehicle; a cover member (140), covering an opening (134) of the casing (130); and a side frame (110), extending in a front-rear direction of the vehicle at a side part of the cover member (140). A first inclined part (141) inclined inward in a vehicle width direction toward a front of the vehicle is provided on a surface (140c) facing an outer side in the vehicle width direction in the cover member (140). A second inclined part (111) inclined inward in the vehicle width direction toward the front of the vehicle is provided on a surface (110d) facing an inner side in the vehicle width direction in the side frame (110). The first inclined part (141) and the second inclined part (111) at least partially face each other, and the first inclined part (141) is inclined more than the second inclined part (111). a front end (140b) of the first inclined part (141) in the cover member (140) extends to a position ahead of a mating surface (135) with the cover member (140) in the casing (130).

According to the configuration, since the first inclined part of the cover member and the second inclined part of the side frame at least partially face each other, at the time of a collision of the vehicle, in the case where the high voltage device (the casing and the cover member) in the accommodation part provided at the rear part of the vehicle is displaced forward by inputting a load of the collision from the front part of the vehicle, the first inclined part of the cover member displaced forward comes into contact (collides) with the second inclined part of the side frame. At this time, by arranging both of the first inclined part and the second inclined part as inclined surfaces inclined inward in the vehicle width direction toward the front of the vehicle, it is possible for the first inclined part and the second inclined part to slide and move relatively in an oblique direction through contact of the inclined surfaces. Therefore, it is possible to effectively alleviate the impact or the load of such contact (collision). Therefore, it is possible to effectively protect the high voltage device from an impact due to a collision from the rear of the vehicle.

In addition, in such case, it may also be that at least a portion of the first inclined part (141) of the cover member (140) extends to a position on an inner side with respect to an innermost position in the vehicle width direction in the side frame (110).

Also, in such case, it may also be that a position limiting member (150) for the cover member (140) is interposed on a mating surface (135, 145) between the casing (130) and the cover member (140), and multiple position limiting members (150) are provided on the mating surface (135, 145).

Also, in such case, it may also be that the position limiting members (150) are disposed at positions overlapped with the second inclined part (111) of the side frame (110) when viewed from the vehicle width direction.

It should be noted that, for the purpose of reference, the numerals in parentheses indicate the drawing reference numbers of corresponding components in the embodiments described later.

According to the high voltage device mounting structure of the vehicle according to the invention, it is possible to appropriately protect the high voltage device and the casing thereof at the time of a collision of the vehicle by using a simpler structure.

In the following, the embodiments of the invention are described in detail with reference to the accompanying drawings. In the following description, the front refers to a front side that is an advancing direction of a vehicle body (vehicle) to be described in the following, and the rear refers to a rear side direction (orientation) that is a reverse direction of the vehicle body. In the following, upper, lower, left, and right respectively refers to the upper, lower, left, and right in the state of facing the advancing direction (front side) of the vehicle body (vehicle).

First Embodiment

Figure 1:
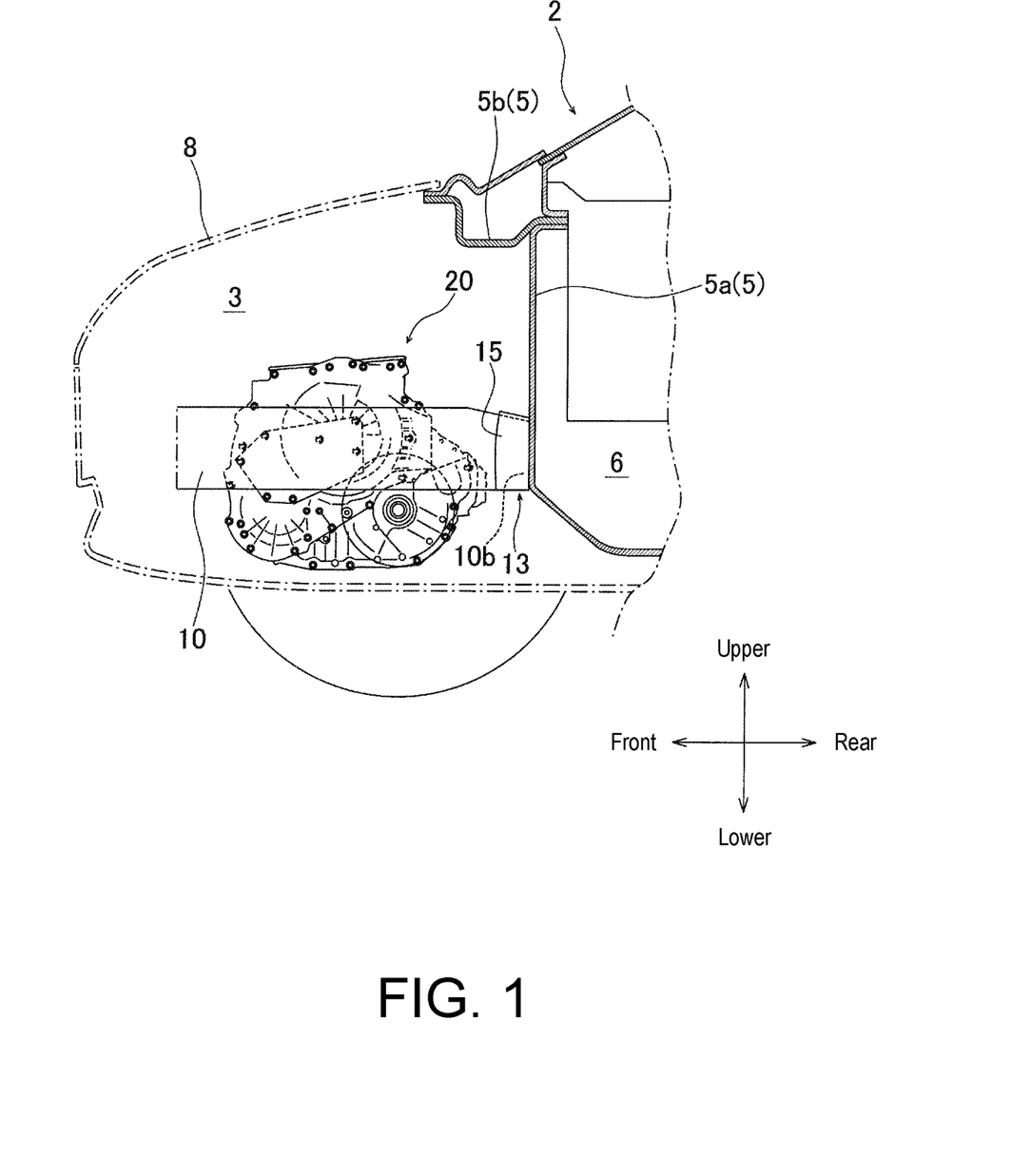
FIG. 1 is a schematic side view illustrating a front part of a vehicle body including a high voltage device mounting structure according to a first embodiment of the invention.

FIG. 1 is a schematic side view illustrating a front part of the vehicle body including a high voltage device mounting structure according to a first embodiment of the invention. In the front part of a vehicle body 2 shown in the same figure, an engine room (front space) 3 for accommodating a driving device 20 including a motor M and an generator G (a high voltage device of the invention), which will be described afterwards, is defined. The engine room 3 is located in front of a vehicle compartment 6, with a dashboard 5 interposed therebetween.

The dashboard 5 extends throughout the entirety of the vehicle body 2 in the left-right direction. The dashboard 5 has a dashboard lower 5a extending in the upper-lower direction and a dashboard upper 5b projecting forward from the upper end of the dashboard lower 5a. The lower end of the dashboard 5a is connected to a floor panel (not shown). The dashboard lower 5a is a partition member that is disposed at the rear part of the engine room 3 and partitions the engine room 3 and the vehicle compartment 6.

A pair of side frames 10 extend along the front-rear direction to the two sides of the engine room 3 in the left-right direction (vehicle width direction). In the figure, only the side frame 10 on the left side (the front side of the figure) is shown, and the side frame on the right side is omitted. A rear end 10b of the side frame 10 is integrated with the dashboard lower 5a. In the embodiment, the side frames 10 form a lower skeleton of the left and right side parts of the engine room 3.

In addition, an upper opening of the engine room 3 is covered by a bonnet 8 from the top. A rear end of the bonnet 8 is rotatably supported by the vehicle body 2. Accordingly, the engine room 3 is configured to be openable.

Figure 2A:
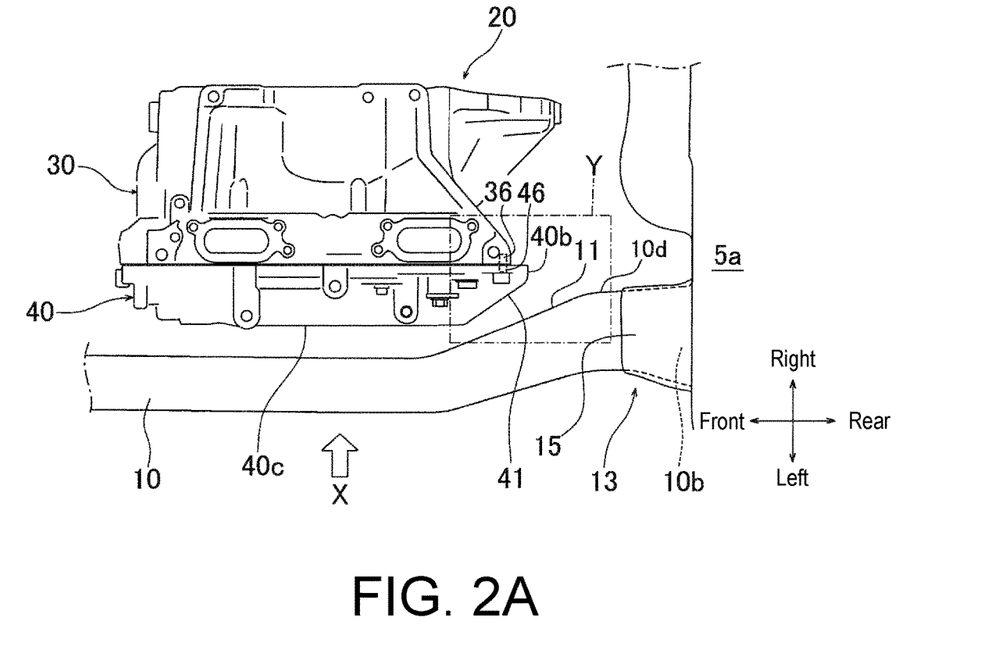
FIG. 2A is a plan view illustrating a configuration of a motor casing and a side frame in an engine room and FIG. 2B is a side view (a view of an arrow X of FIG. 2A) illustrating the configuration of the motor casing and the side frame in the engine room.
Figure 2B:
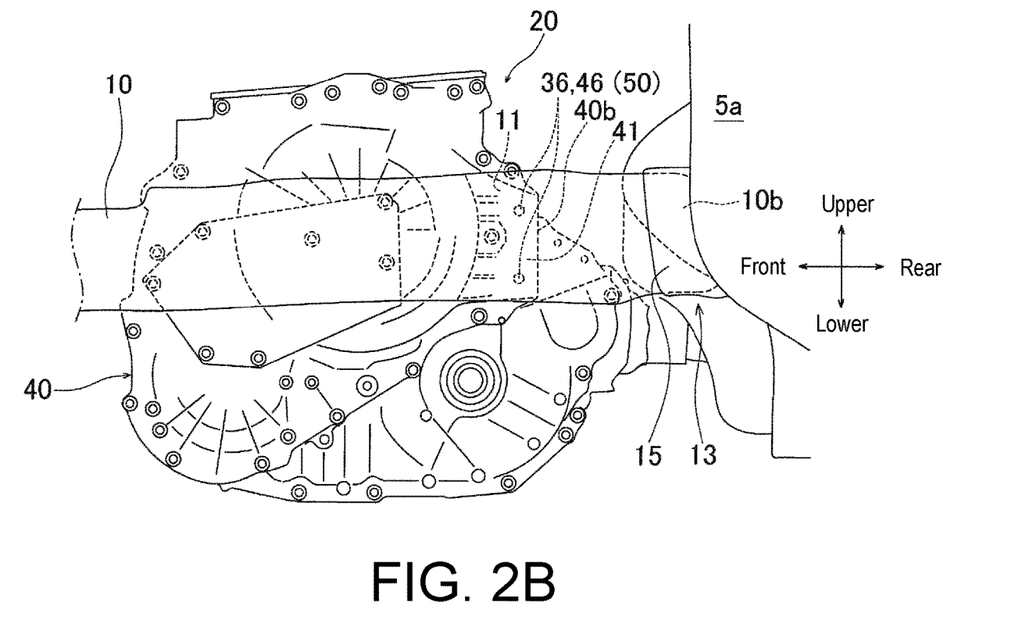
Figure 3:
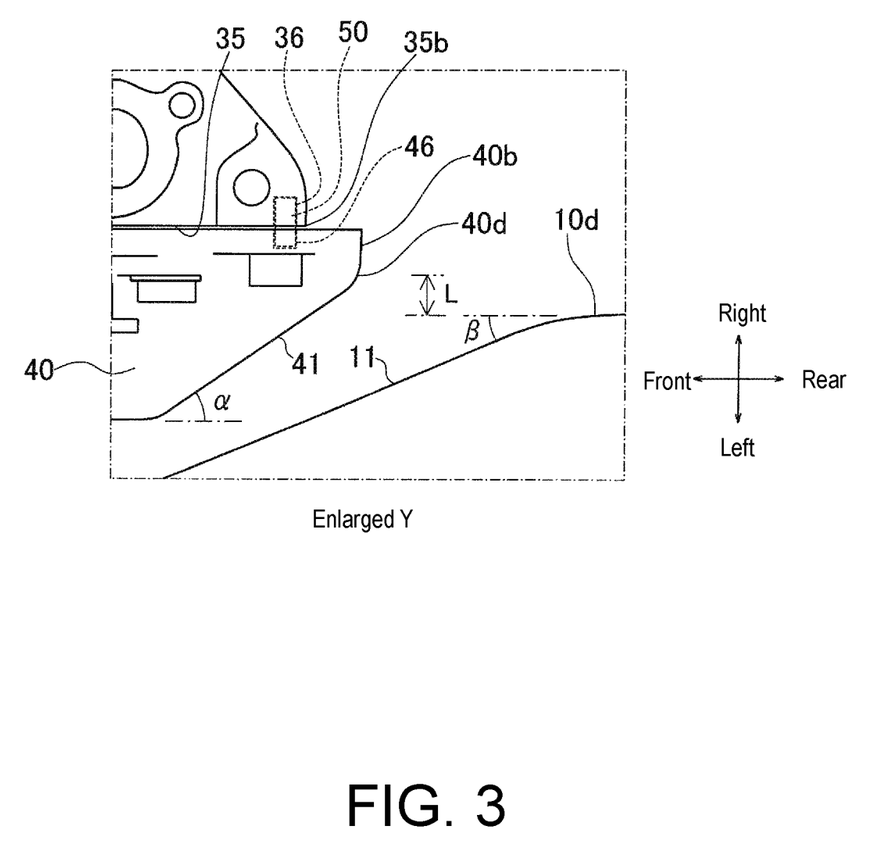
FIG. 3 is an enlarged view of a portion Y of FIG. 2A.

FIG. 2A is a plan view illustrating a configuration of a driving device in an engine room and FIG. 2B is a side view (a view of an arrow X of FIG. 2A) illustrating the configuration of the driving device in the engine room. In addition, FIG. 3 is an enlarged view of a portion Y of FIG. 2A. The driving device 20 that is a driving source of the vehicle is contained in the engine room 3. The driving device 20 is disposed in adjacency with the inner side, in the vehicle width direction, of the left side frame 10 in the engine room 3. The driving device 20 is supported via a vibration damping member, etc., by a frame-shaped sub-frame (not shown) disposed below the side frame 10 in the engine room 3. The sub-frame is connected with the side frame 10, etc.

Figure 4A:
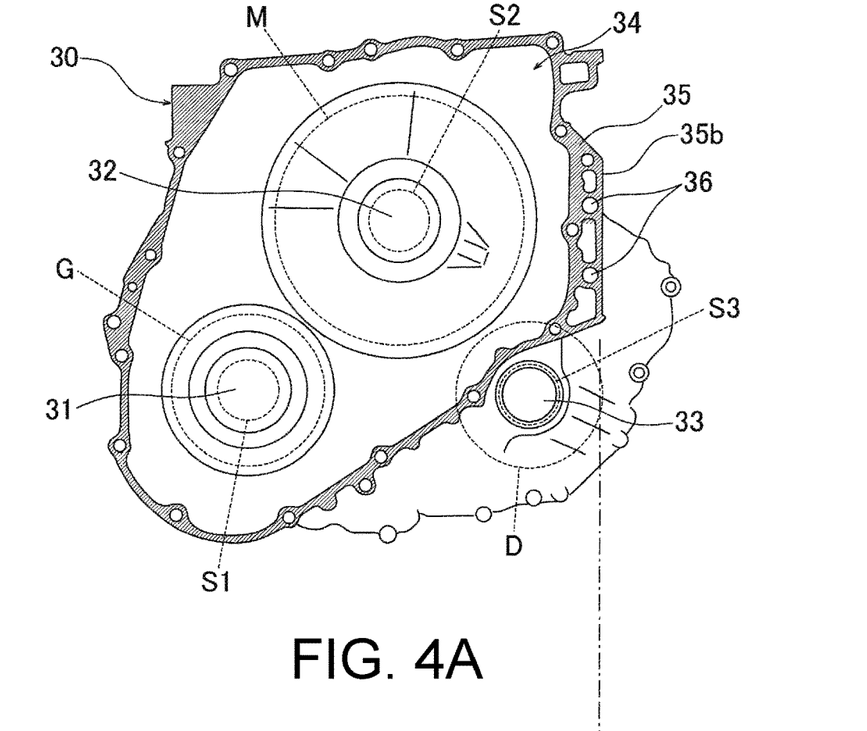
FIG. 4A is a side view illustrating the casing in a state in which a side cover is removed.
Figure 4B:
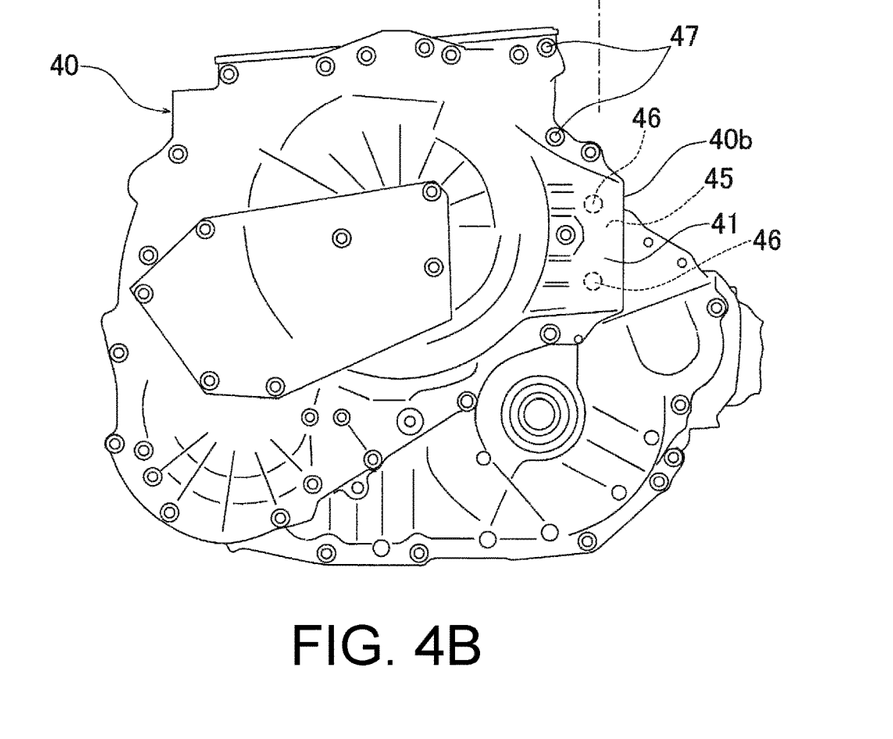
FIG. 4B is a side view illustrating the casing in a state in which the side cover is installed.

FIG. 4A is a side view illustrating the casing of the driving device in a state in which a side cover to be described afterwards is removed, and FIG. 4B is a side view illustrating the casing in a state in which the side cover is installed. A casing 30 of the driving device 20 includes a generator accommodation part 31, a motor accommodation part 32, a differential mechanism accommodation part 33, and an opening 34. The generator accommodation part 31 mainly accommodates the generator G that is an electric motor for power generation. The motor accommodation part 32 mainly accommodates the motor M that is an electric motor for driving which mainly serves as the driving source of the vehicle. The differential mechanism accommodation part 33 accommodates a differential mechanism D. The opening 34 is formed on a side surface on the left side. In addition, a side cover (cover member) 40 that covers the opening 34 of the casing 30 is provided. The side cover 40 blocks the opening 34 by covering the opening 34 of the casing 30, and, in such state, is fixed to a mating surface 35 in the periphery of the opening 34 by fastening with a bolt (fastener) 47 (see FIG. 4B). The generator G, the motor M, and the differential mechanism D in the casing 30 are disposed in a state in which the axial directions of rotation shafts S1, S2, S3 thereof are disposed in a state of being in the left-right direction of the vehicle. Although the detailed illustration is omitted, the generator G and the motor M are connected to a battery through a cable, etc., and able to receive power supply from the battery and regenerate energy to the battery.

As shown in FIGS. 2A, 2B, and 3, on a surface (outer surface) 40c facing the outer side in the vehicle width direction at a rear end 40b of the side cover 40, a first inclined surface (first inclined part) 41 inclined inward in the vehicle width direction toward the rear of the vehicle is provided. The first inclined surface 41 is in a shape of cutting the outer surface 40c of the rear end 40b of the side cover 40 to resemble an inclined surface when viewed in a plan view, and the outer surface 40c of the side cover 40 is inclined from the outer side toward the inner side in the vehicle width direction, so that the thickness dimension of the side cover 40 is gradually reduced toward the rear.

Meanwhile, on a surface (inner surface) 10d facing the inner side in the vehicle width direction in the side frame 10, a second inclined surface (second inclined part) 11 inclined inward in the vehicle width direction toward the rear of the vehicle is provided. The first inclined surface 41 of the side cover 40 and the second inclined surface 11 of the side frame 10 face each other (face-to-face), and are disposed at positions at least partially overlapped with each other when viewed in the vehicle width direction of the vehicle and disposed at positions at least partially overlapped with each other when viewed in the front-rear direction of the vehicle.

In addition, the first inclined surface 41 of the side cover 40 is more inclined than the second inclined surface 11 of the side frame 10. That is, as shown in FIG. 3, an angle α at which the first inclined surface 41 of the side cover 40 is inclined toward the inner side of the vehicle width direction is greater than an angle β at which the second inclined surface 11 of the side frame 10 is inclined toward the inner side of the vehicle width direction. That is, $\alpha > \beta$.

In addition, the rear end of the first inclined surface 41 in the side cover 40 (the rear end 40b of the side cover 40) extends to a position behind a rear end 35b of the mating surface 35 with the side cover 40 in the casing 30. That is, the rear end 40b of the side cover 40 protrudes rearward with respect to the mating surface 35 of the casing 30.

In addition, as shown in FIG. 3, a portion of the first inclined surface 41 of the side cover 40 extends to a position inward of a position 10d on the innermost side in the vehicle width direction in the side frame 10. That is, a position 40d on the innermost side of the first inclined surface 41 of the side cover 40 in the vehicle width direction is located at an inner side in the vehicle with direction with respect to the position 10d on the innermost side in the side frame 10 in the vehicle width direction by a dimension L.

Figure 5:
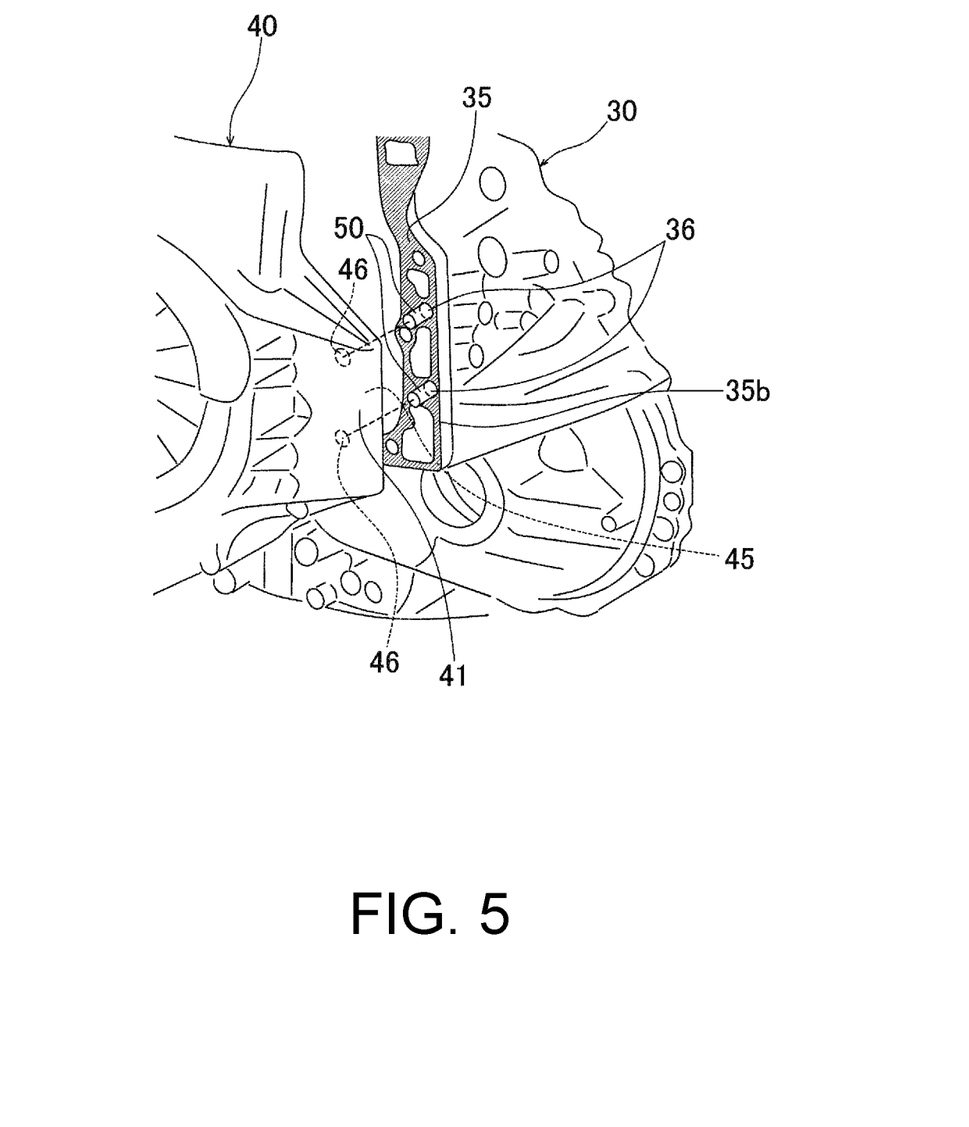
FIG. 5 is a perspective view illustrating a mating surface between the casing and the side cover, and is a view illustrating an insertion hole in which a knock pin is inserted.

FIG. 5 is a perspective view illustrating the mating surface between the casing and the side cover. An insertion hole 36 for insertion of a knock pin (positioning limiting member) 50 for positioning the side cover 40 is provided on the mating surface 35 of the casing 30 at a position corresponding to the first inclined surface 41 of the side cover 40. Multiple insertion holes 36 are provided. In the illustration, two insertion holes 36 (at the same positions in the front-rear direction) are arranged side-by-side in the upper-lower direction. In addition, as shown in FIGS. 2A and 2B, the two insertion holes 36 are disposed at positions overlapped with the second inclined surface 11 of the side frame 10 when viewed in the vehicle width direction. In addition, at also the positions facing the insertion holes 36 on a mating surface 45 provided on the inner surface of the side cover 40, insertion holes 46 for insertion of the knock pins 50 are provided. By inserting the knock pins 50 to both of the insertion holes 36 and the insertion holes 46, the side cover 40 is positioned with respect to the opening 34 of the casing 30. In the embodiment, by inserting the knock pin 50 to each set of the insertion holes 36, 36, two (multiple) knock pins 50 are interposed between the mating surfaces 35, 45 of the casing 30 and the side cover 40. Moreover, when viewed in the vehicle width direction, the two knock pins 50 are disposed at positions overlapped with the first inclined surface 41 of the side cover 40 and the second inclined surface 11 of the side frame 10.

As shown in FIGS. 2A and 2B, the rear end 10b of the side frame 10 is connected to the dashboard lower 5a partitioning the engine room 3 and the vehicle compartment 6. In the embodiment, a connection part 13 to which the side frame 10 and the dashboard lower 5a are connected bonds the two members through welding, and a reinforcement member 15 that reinforces the connection part 13 is installed. The reinforcement member 15 is a metallic plate member installed to cover the connection part 13, so as to straddle the two side surfaces from the upper surface of the connection part 13, and the reinforcement member 15 is also installed to the connection part 13 through welding. In addition, the reinforcement member 15 and the second inclined surface 11 of the side frame 10 are disposed side-by-side in the front-rear direction of the vehicle at the same position in the vehicle width direction.

In the embodiment, the casing 30 accommodating the generator G and the motor M provided in the engine room 3 of the vehicle, the side cover (cover member) 40 covering the opening 34 of the casing 30 and the side frame 10 extending in the front-rear direction on the side part of the engine room 3 are provided. In addition, on the surface facing the outer side in the vehicle width direction in the side cover 40, the first inclined surface (first inclined part) 41 inclined inward in the vehicle width direction toward the rear of the vehicle is provided, and, on the surface facing the inner side in the vehicle width direction in the side frame 10, the second inclined surface (second inclined part) 11 inclined inward in the vehicle width direction toward the rear of the vehicle is provided. Moreover, the first inclined surface 41 and the second inclined surface 11 are disposed to face each other (in a face-to-face state), and the first inclined surface 41 and the second inclined surface 11 are at positions at least partially overlapped with each other in the vehicle width direction and the front-rear direction of the vehicle. In addition, the first inclined surface 41 is more inclined than the second inclined surface 11. Furthermore, the rear end 40b of the first inclined surface 41 in the side cover 40 extends to a position behind the rear end 35b of the mating surface 35 with the side cover 40 in the casing 30.

According to the embodiment, by making the first inclined surface 41 of the side cover 40 and the second inclined surface 11 of the side frame 10 face each other, at the time of a collision of the vehicle, in the case where the driving device 20 (the casing 30 and the side cover 40) in the engine room 3 is displaced rearward by inputting a load of the collision from the front part of the vehicle, the first inclined surface 41 of the side cover 40 displaced rearward comes into contact (collides) with the second inclined surface 11 of the side frame 10. At this time, by arranging both of the first inclined surface 41 and the second inclined surface 11 as inclined surfaces inclined inward in the vehicle width direction toward the rear of the vehicle, it is possible for the first inclined surface 41 and the second inclined surface 11 to slide and move relatively in an oblique direction through contact of the inclined surfaces. Therefore, it is possible to effectively alleviate or spread the impact or the load of such contact (collision) to the driving device 20. In particular, by making the first inclined surface 41 more inclined than the second inclined surface 11, it is possible to more effectively alleviate the impact or the load of the contact (collision).

In the embodiment, furthermore, with the rear end 40*b* of the first inclined surface 41 in the side cover 40 extending to a position behind the rear end 35*b* of the mating surface 35 with the side cover 40 in the casing 30, it is possible to increase the length of the first inclined surface 41 of the side cover 40, so the impact or the load of the contact (collision) between the first inclined surface 41 and the second inclined surface 11 can be effectively reduced. In addition, even in the case where the side cover 40 and the casing 30 come into contact with other components, such as the dashboard lower 5*a*, etc., located behind the engine room 3 after the first inclined surface 41 of the side cover 40 comes into contact (collides) with the second inclined surface 11 of the side frame 10, the impact of the collision to the casing 30 can be reduced, as the rear end 40*b* of the side cover 40 contacts such other components prior to the casing 30. Therefore, it is possible to effectively protect the generator G and the motor M by preventing the damage of the casing 30 in advance.

In addition, in the embodiment, at least a portion of the first inclined surface 41 of the side cover 40 extends to a position on the inner side with respect to an innermost position in the vehicle width direction in the side frame 10.

According to the configuration, with at least a portion of the first inclined surface 41 of the side cover 40 extending to the position on the inner side with respect to the innermost position in the vehicle width direction in the side frame, the contact of the inclined surfaces between the first inclined surface 41 of the side cover 40 and the second inclined surface 11 of the side frame 10 can be reliably carried out, and the first inclined surface 41 of the side cover 40 and the second inclined surface 11 of the side frame 10 can slide and move relatively in an oblique direction.

In addition, in the high voltage device mounting structure of the vehicle according to the embodiment, the knock pins (positioning limiting members) 50 for positioning the side cover 40 are interposed between the mating surfaces 35, 45 of the casing 30 and the side cover 40, and the knock pins 50 are provided on the mating surfaces 35, 45.

According to the configuration, with the knock pins 50 interposed on the mating surfaces 35, 45 between the casing 30 and the side cover 40, it is possible to easily and reliably position the side cover 40 with respect to the casing 30.

In addition, the multiple knock pins 50 are disposed at positions overlapped with the second inclined surface 11 of the side frame 10 when viewed from the vehicle width direction.

According to the configuration, by disposing the knock pins 50 at the positions overlapped with the second inclined surface 11 of the side frame 10 when viewed from the vehicle width direction, in the case where the first inclined surface 41 of the side cover 40 comes into contact (collides) with the second inclined surface 11 of the side frame 10, the concern that the position of the side cover 40 is deviated or the side cover 40 is damaged can be reduced. Therefore, it is possible to effectively protect the casing 30 as well as the generator G and the motor M in the casing 30.

Moreover, in the embodiment, the dashboard lower 5*a*, which is a partition member disposed at the rear part of the engine room 3 to partition the engine room 3 and the vehicle compartment 6 is provided. The rear end 10*b* of the side frame 10 is connected with the dashboard lower 5*a*, and the reinforcement member 15 that reinforces the connection part 13 is installed to the connection part 13 connected with the side frame 10 and the dashboard lower 5*a*. In addition, the reinforcement member 15 and the second inclined surface 11 of the side frame 10 are disposed side-by-side in the front-rear direction of the vehicle at the same position in the vehicle width direction.

According to the configuration, with the reinforcement member 15 that reinforces the connection part 13 being installed to the connection part 13 connected with the side frame 10 and the dashboard lower 5*a*, at the time of a vehicle collision, in the case of a further rearward displacement after the first inclined surface 41 of the side cover 40 displaced rearward comes into contact (collides) with the second inclined surface 11 of the side frame 10, the side cover 40 is stopped by the reinforcement member 15. Therefore, the displacement amount of the side cover 40 can at least be suppressed. Therefore, since the displacement amount of the casing 30 of the driving device 20 as well as the generator G or the motor M accommodated in the casing 30 is reduced, it is possible to effective protect cables, etc., connected with the generator G or the motor M.

Second Embodiment

In the following, a second embodiment of the invention is described. In the description of the second embodiment and the corresponding drawings, components same as or equivalent to those of the first embodiment are labeled with the same reference symbols, and the detailed description of such components will be omitted in the following. Matters other than those described below and matters other than those shown in the drawings are the same as those of the first embodiment.

Figure 6:
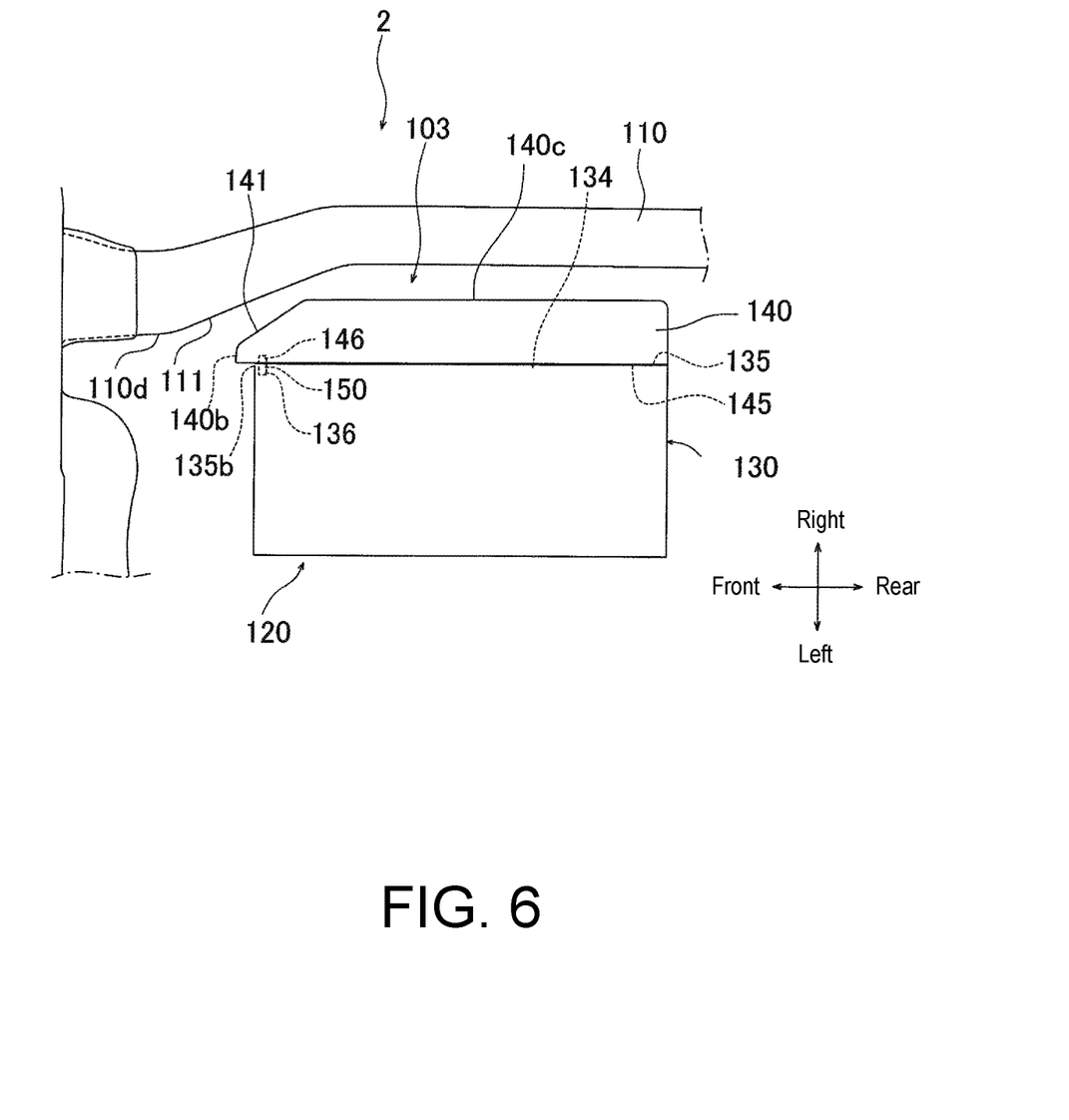
FIG. 6 is a schematic plan view illustrating a rear part of a vehicle body including a high voltage device mounting structure according to a second embodiment of the invention.

FIG. 6 is a schematic plan view illustrating a rear part of a vehicle body including a high voltage device mounting structure according to the second embodiment of the invention. In the rear part of the vehicle body 2 shown in the same figure, an accommodation part 103 for accommodating a casing 130 of a high voltage device 120, such as a power control unit (PCU) or a battery driving device, driven at a high voltage is defined. Although the detailed illustration is omitted, the accommodation part 103 is an accommodation space disposed at the lower part of a trunk room provided at the rear part of the vehicle body 2.

A pair of side frames 110 extend along the front-rear direction to the two sides of the accommodation part 103 in the left-right direction (vehicle width direction). In the figure, only the side frame 110 on the right side is shown, and the side frame on the left side is omitted. In the embodiment, the side frames 110 form a lower skeleton of the left and right side parts of the accommodation part 103.

An opening 134 is formed on a side surface on the right side in the casing 130 of the high voltage device. In addition, a side cover (cover member) 140 that covers the opening 134 of the casing 130 is provided. The side cover 140 blocks the opening 134 by covering the opening 134 of the casing 130, and, in such state, is fixed to a mating surface 135 in the periphery of the opening 134 by fastening with a bolt (not shown), etc.

In addition, on a surface (outer surface) 140*c* facing the outer side in the vehicle width direction at a front end 140*b* of the side cover 140, a first inclined surface (first inclined part) 141 inclined inward in the vehicle width direction toward the front of the vehicle is provided. The first inclined surface 141 is in a shape of cutting the outer surface 140*c* of the front end 140*b* of the side cover 140 to resemble an inclined surface when viewed in a plan view, and the outer surface 140c of the side cover 140 is inclined from the outer side toward the inner side in the vehicle width direction, so that the thickness dimension of the side cover 140 is gradually reduced toward the front.

Meanwhile, on a surface (inner surface) facing the inner side in the vehicle width direction in the side frame 110, a second inclined surface (second inclined part) 111 inclined inward in the vehicle width direction toward the front of the vehicle is provided. The first inclined surface 141 of the side cover 140 and the second inclined surface 111 of the side frame 110 face each other (face-to-face), and are disposed at positions at least partially overlapped with each other when viewed in the vehicle width direction of the vehicle and disposed at positions at least partially overlapped with each other when viewed in the front-rear direction of the vehicle.

In addition, in the embodiment as well, the first inclined surface 141 of the side cover 140 is more inclined than the second inclined surface 111 of the side frame 110.

In addition, the front end of the first inclined surface 141 in the side cover 140 (the front end 140b of the side cover 140) extends to a position ahead of a front end 135b of the mating surface 135 with the side cover 140 in the casing 130. That is, the front end 140b of the side cover 140 protrudes forward with respect to the mating surface 135 of the casing 130.

In addition, in the embodiment as well, a portion of the first inclined surface 141 of the side cover 140 extends to a position inward of a position 110d on the innermost side in the vehicle width direction in the side frame 110.

An insertion hole 136 for insertion of a knock pin (positioning limiting member) 150 for positioning the side cover 140 is provided on the mating surface 135 of the casing 130 at a position corresponding to the first inclined surface 141 of the side cover 140. Although not shown in the drawings, in the embodiment as well, multiple insertion holes 136 are provided. For example, two insertion holes 136 (at the same positions in the front-rear direction) are arranged side-by-side in the upper-lower direction. In addition, the two insertion holes 136 are disposed at positions overlapped with the second inclined surface 111 of the side frame 110 when viewed in the vehicle width direction. In addition, at also the positions facing the insertion holes 136 on a mating surface 145 provided on the inner surface of the side cover 140, insertion holes 146 for insertion of the knock pins 150 are provided. By inserting the knock pins 150 to both of the insertion holes 136 and the insertion holes 146, the side cover 140 is positioned with respect to the opening 134 of the casing 130.

According to the embodiment, by making the first inclined surface 141 of the side cover 140 and the second inclined surface 111 of the side frame 110 face each other, at the time of a collision of the vehicle, in the case where the high voltage device in the casing 130 (the casing 130 and the side cover 140) is displaced forward by inputting a load of the collision from the rear part of the vehicle, the first inclined surface 141 of the side cover 140 displaced forward comes into contact (collides) with the second inclined surface 111 of the side frame 110. At this time, by arranging both of the first inclined surface 141 and the second inclined surface 111 as inclined surfaces inclined inward in the vehicle width direction toward the front of the vehicle, it is possible for the first inclined surface 141 and the second inclined surface 111 to slide and move relatively in an oblique direction through contact of the inclined surfaces. Therefore, it is possible to effectively alleviate or spread the impact or the load of such contact (collision) to the high voltage device. In particular, by making the first inclined surface 141 more inclined than the second inclined surface 111, it is possible to more effectively alleviate the impact or the load of the contact (collision).

In the embodiment, furthermore, with the front end 140b of the first inclined surface 141 in the side cover 140 extending to a position ahead of the front end 135b of the mating surface 135 with the side cover 140 in the casing 130, it is possible to increase the length of the first inclined surface 141 of the side cover 140, so the impact or the load of the contact (collision) between the first inclined surface 141 and the second inclined surface 111 can be effectively reduced. In addition, even in the case where the side cover 140 and the casing 130 come into contact with other components located ahead of the accommodation part 103 after the first inclined surface 141 of the side cover 140 comes into contact (collides) with the second inclined surface 111 of the side frame 110, the impact of the collision to the casing 130 can be reduced, as the front end 140b of the side cover 140 contacts such other components prior to the casing 130. Therefore, it is possible to effectively protect the high voltage device by preventing the damage of the casing 130 in advance.

In addition, in the embodiment as well, at least a portion of the first inclined surface 141 of the side cover 140 extends to a position on the inner side with respect to an innermost position 110d in the vehicle width direction in the side frame 110.

According to the configuration, with at least a portion of the first inclined surface 141 of the side cover 140 extending to the position on the inner side with respect to the innermost position 110d in the vehicle width direction in the side frame 110, the contact of the inclined surfaces between the first inclined surface 141 of the side cover 140 and the second inclined surface 111 of the side frame 110 can be reliably carried out, and the first inclined surface 141 of the side cover 140 and the second inclined surface 111 of the side frame 110 can slide and move relatively in an oblique direction.

In addition, in the embodiment as well, the knock pins (positioning limiting members) 150 for positioning the side cover 140 are interposed between the mating surfaces 135, 145 of the casing 130 and the side cover 140, and the knock pins 150 are provided on the mating surfaces 135, 145.

According to the configuration, with the knock pins 150 interposed on the mating surfaces 135, 145 between the casing 130 and the side cover 140, it is possible to easily and reliably position the side cover 140 with respect to the casing 130.

In addition, the multiple knock pins 150 are disposed at positions overlapped with the second inclined surface 111 of the side frame 110 when viewed from the vehicle width direction.

According to the configuration, by disposing the knock pins 150 at the positions overlapped with the second inclined surface 111 of the side frame 110 when viewed from the vehicle width direction, in the case where the first inclined surface 141 of the side cover 140 comes into contact (collides) with the second inclined surface 111 of the side frame 110, the concern that the position of the side cover 140 is deviated or the side cover 140 is damaged can be reduced. Therefore, it is possible to effectively protect the casing 130 as well as the high voltage device in the casing 130.

Although the embodiments of the invention have been described above, the invention is not limited to the above embodiments, and various modifications can be made within the scope of the technical ideas described in the claims, the specification and the drawings. For example, in the first embodiment, the first inclined surface 41 of the side cover 40 is a surface facing the left side in the vehicle width direction of the vehicle, and the second inclined surface 11 of the side frame 10 facing the first inclined surface 41 is a surface facing the right side in the vehicle width direction of the vehicle. However, other than this, although not shown in the drawings and detailed description, it may also be that the first inclined surface 41 of the side cover 40 is arranged as a surface facing the right side in the vehicle width direction and the second inclined surface 11 of the side frame 10 facing the first inclined surface 41 is a surface facing the left side in the vehicle width direction of the vehicle. Similarly, in the second embodiment, the first inclined surface 141 of the side cover 140 is a surface facing the right side in the vehicle width direction of the vehicle, and the second inclined surface 111 of the side frame 110 facing the first inclined surface 141 is a surface facing the left side in the vehicle width direction of the vehicle. However, other than this, although omitted in the drawings and detailed description, it may also be that the first inclined surface 141 of the side cover 140 is arranged as a surface facing the left side in the vehicle width direction and the second inclined surface 111 of the side frame 110 facing the first inclined surface 141 is a surface facing the right side in the vehicle width direction of the vehicle.

In addition, it is not limited that the first inclined surface 41 (141) and the second inclined surface 11 (111) entirely face each other. It may also be that the first inclined surface 41 (141) and the second inclined surface 11 (111) only partially face each other. In addition, as long as the first inclined surface 41 (141) and the second inclined surface 11 (111) are at positions overlapped with each other in the front-rear direction of the vehicle (at least portions of the first inclined surface 41 (141) and the second inclined surface 11 (111) are at the same position when viewed in the front-rear direction), the first inclined surface 41 (141) and the second inclined surface 11 (111) are not required to overlap each other in the vehicle width direction (portions of the first inclined surface 41 (141) and the second inclined surface 11 (111) are at the same position when viewed in the vehicle width direction) of the vehicle, and the front and rear positions may be arranged at different positions.

In addition, although the first embodiment describes the case where the high voltage device of the invention is the motor (electric motor) M and the generator (electric motor) G accommodated in the casing 30, the high voltage device driven at a high voltage according to the invention is not limited to the motor M and the generator G. For example, as shown in the second embodiment, the high voltage device may also be another device, such as a power control unit (PCU). Here, although omitted in the drawings and detailed description, the PCU may be configured to include electrical components, such as an inverter for driving a motor, a boost converter for controlling a voltage, a DC-DC converter for stepping down a high voltage, etc., and such electrical components are accommodated in the casing. In addition to the PCU, a high voltage battery or various control devices which control a battery may also serve as the high voltage device of the invention.

What is claimed is:

1. A high voltage device mounting structure of a vehicle, the high voltage device mounting structure comprising:
    a casing, accommodating a high voltage device driven at a high voltage and disposed in an engine room of the vehicle;
    a cover member, covering an opening of the casing; and
    a side frame, extending in a front-rear direction of the vehicle at a side part of the engine room,
    wherein a first inclined part inclined inward in a vehicle width direction toward a rear of the vehicle is provided on a surface facing an outer side in the vehicle width direction in the cover member,
    a second inclined part inclined inward in the vehicle width direction toward the rear of the vehicle is provided on a surface facing an inner side in the vehicle width direction in the side frame,
    the first inclined part and the second inclined part at least partially face each other, and the first inclined part is inclined more than the second inclined part, and
    a rear end of the first inclined part in the cover member extends to a position behind a mating surface with the cover member in the casing.

2. The high voltage device mounting structure of the vehicle as claimed in claim 1, wherein the high voltage device accommodated in the casing is an electric motor.

3. The high voltage device mounting structure of the vehicle as claimed in claim 1, wherein at least a portion of the first inclined part of the cover member extends to a position on an inner side with respect to an innermost position in the vehicle width direction in the side frame.

4. The high voltage device mounting structure of the vehicle as claimed in claim 1, wherein a position limiting member for the cover member is interposed on a mating surface between the casing and the cover member, and
    a plurality of the position limiting members are provided on the mating surface.

5. The high voltage device mounting structure of the vehicle as claimed in claim 4, wherein the position limiting members are disposed at positions overlapped with the second inclined part of the side frame when viewed from the vehicle width direction.

6. The high voltage device mounting structure of the vehicle as claimed in claim 1, comprising:
    a partition member, disposed at a rear part of the engine room to partition the engine room and a vehicle compartment,
    wherein a rear end of the side frame is connected with the partition member, and
    a reinforcement member reinforcing a connection part connected with the side frame and the partition member is installed to the connection part.

7. The high voltage device mounting structure of the vehicle as claimed in claim 6, wherein the second inclined part of the side frame and the reinforcement part are disposed side-by-side in the front-rear direction of the vehicle and at a same position in the vehicle width direction.

8. The high voltage device mounting structure of the vehicle as claimed in claim 2, wherein at least a portion of the first inclined part of the cover member extends to a position on an inner side with respect to an innermost position in the vehicle width direction in the side frame.

9. The high voltage device mounting structure of the vehicle as claimed in claim 2, wherein a position limiting member for the cover member is interposed on a mating surface between the casing and the cover member, and
    a plurality of the position limiting members are provided on the mating surface.

10. The high voltage device mounting structure of the vehicle as claimed in claim 9, wherein the position limiting members are disposed at positions overlapped with the second inclined part of the side frame when viewed from the vehicle width direction.

11. The high voltage device mounting structure of the vehicle as claimed in claim 2, comprising:
- a partition member, disposed at a rear part of the engine room to partition the engine room and a vehicle compartment,
- wherein a rear end of the side frame is connected with the partition member, and
- a reinforcement member reinforcing a connection part connected with the side frame and the partition member is installed to the connection part.

12. The high voltage device mounting structure of the vehicle as claimed in claim 11, wherein the second inclined part of the side frame and the reinforcement part are disposed side-by-side in the front-rear direction of the vehicle and at a same position in the vehicle width direction.

13. A high voltage device mounting structure of a vehicle, the high voltage device mounting structure comprising:
- a casing, accommodating a high voltage device driven at a high voltage and disposed in the vehicle:
- a cover member, covering an opening of the casing; and
- a side frame, extending in a front-rear direction of the vehicle at a side part of the cover member,
- wherein a first inclined part inclined inward in a vehicle width direction toward a front of the vehicle is provided on a surface facing an outer side in the vehicle width direction in the cover member,
- a second inclined part inclined inward in the vehicle width direction toward the front of the vehicle is provided on a surface facing an inner side in the vehicle width direction in the side frame,
- the first inclined part and the second inclined part at least partially face each other, and the first inclined part is inclined more than the second inclined part, and
- a front end of the first inclined part in the cover member extends to a position ahead of a mating surface with the cover member in the casing.

14. The high voltage device mounting structure of the vehicle as claimed in claim 13, wherein at least a portion of the first inclined part of the cover member extends to a position on an inner side with respect to an innermost position in the vehicle width direction in the side frame.

15. The high voltage device mounting structure of the vehicle as claimed in claim 13, wherein a position limiting member for the cover member is interposed on a mating surface between the casing and the cover member, and
- a plurality of the position limiting members are provided on the mating surface.

16. The high voltage device mounting structure of the vehicle as claimed in claim 15, wherein the position limiting members are disposed at positions overlapped with the second inclined part of the side frame when viewed from the vehicle width direction.

17. The high voltage device mounting structure of the vehicle as claimed in claim 14, wherein a position limiting member for the cover member is interposed on a mating surface between the casing and the cover member, and
- a plurality of the position limiting members are provided on the mating surface.

18. The high voltage device mounting structure of the vehicle as claimed in claim 17, wherein the position limiting members are disposed at positions overlapped with the second inclined part of the side frame when viewed from the vehicle width direction.

* * * * *